US00RE40462E

(19) United States
(12) Reissued Patent
Vogel

(10) Patent Number: US RE40,462 E
(45) Date of Reissued Patent: Aug. 26, 2008

(54) HAIR CLIP INNER PROTECTOR

(76) Inventor: Sarah A. Vogel, 416 Seventh Ave., Menlo Park, CA (US) 94025

(21) Appl. No.: 10/340,073

(22) Filed: Jan. 10, 2003

Related U.S. Patent Documents

Reissue of:
(64) Patent No.: 6,394,102
Issued: May 28, 2002
Appl. No.: 09/631,802
Filed: Aug. 4, 2000

(51) Int. Cl.
*A45D 8/04* (2006.01)
*A45D 8/22* (2006.01)

(52) U.S. Cl. ..... 132/273; 132/279

(58) Field of Classification Search ..... 132/273, 132/279, 275, 276, 277, 278; 24/505–507, 24/521, 327, 489, 517–518, 30.5 R; 28/39–42; 2/174

See application file for complete search history.

(56) References Cited

U.S. PATENT DOCUMENTS

| | | | | | |
|---|---|---|---|---|---|
| 2,661,748 | A | * | 12/1953 | Racho | 132/276 |
| 4,912,944 | A | * | 4/1990 | Crosley et al. | 63/29.2 |
| 5,303,724 | A | * | 4/1994 | Anzivino | 132/278 |
| 5,477,870 | A | * | 12/1995 | Menaged | 132/279 |
| 5,697,387 | A | * | 12/1997 | Hanisco | 132/275 |
| 5,735,295 | A | * | 4/1998 | Sammon | 132/275 |
| 5,975,092 | A | * | 11/1999 | Tsai | 132/75 |
| 6,257,251 | B1 | * | 7/2001 | Burleson et al. | 132/279 |

* cited by examiner

*Primary Examiner*—Robyn Doan
(74) *Attorney, Agent, or Firm*—David R. Stevens; Stevens Law Group

(57) ABSTRACT

A predetermined shaped material that surrounds the arms of a steel hair clip such that a large rectangular portion (20) surrounds each arm and a small rectangular middle portion (22) covers the clasp. The small rectangular middle portion prevents hair from getting caught in the clasp. Each large rectangular portion adheres to the hair and compacts allowing the clip to better fit a broader range of hair thicknesses.

3 Claims, 4 Drawing Sheets

AMENDED

PRIOR ART
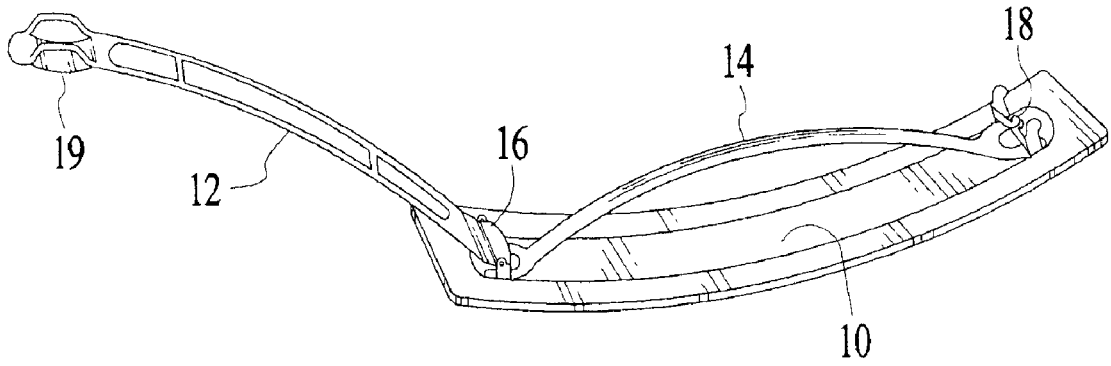
FIG. 1
AMENDED

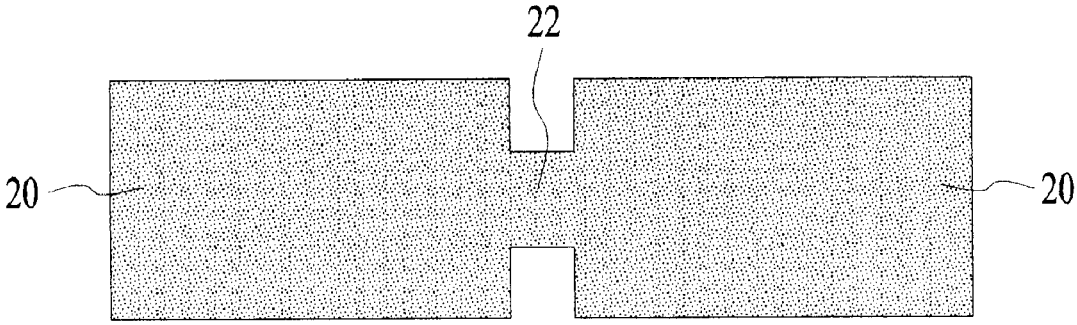
FIG. 2
AMENDED
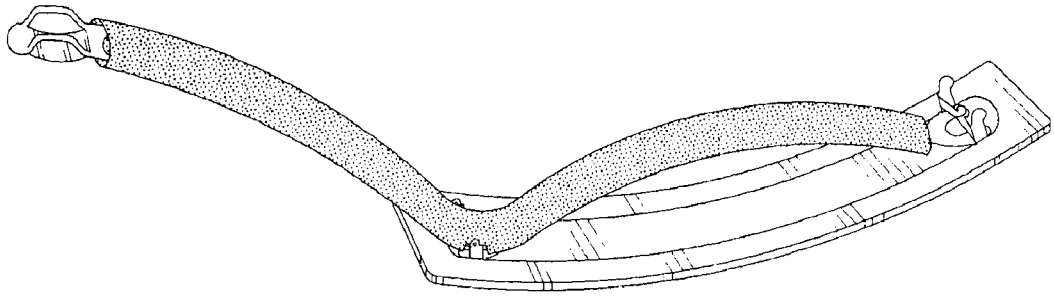
FIG. 3
AMENDED

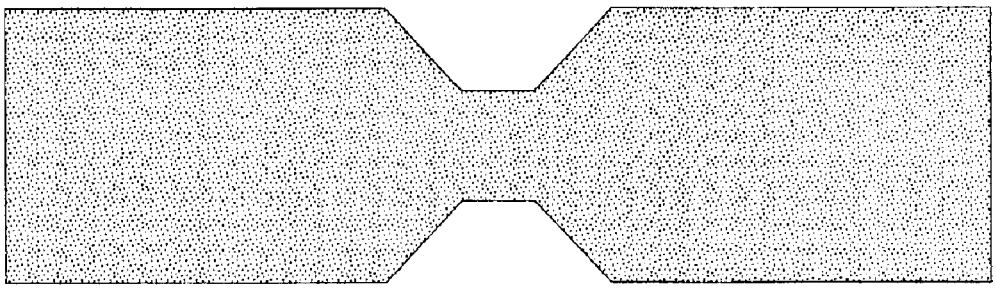
FIG. 4
AMENDED
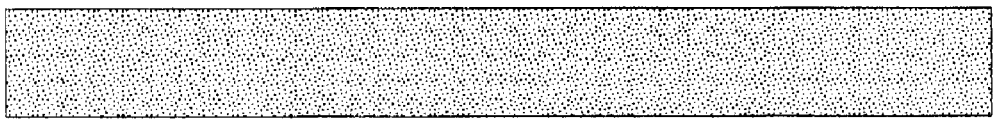
FIG. 5
AMENDED

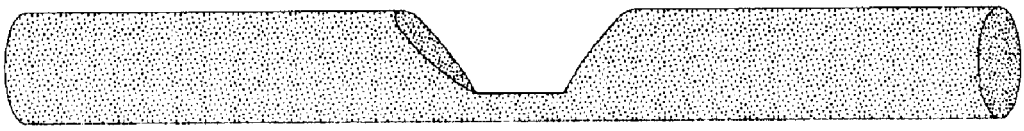
FIG. 6
AMENDED
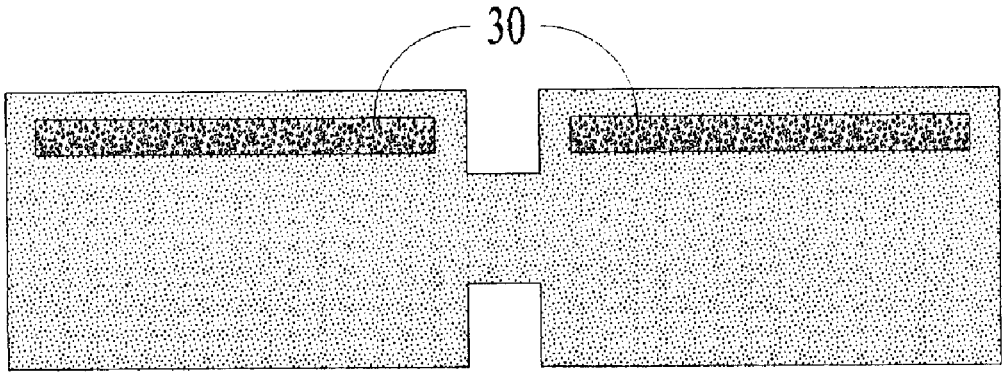
FIG. 7
AMENDED

HAIR CLIP INNER PROTECTOR

Matter enclosed in heavy brackets [ ] appears in the original patent but forms no part of this reissue specification; matter printed in italics indicates the additions made by reissue.

CROSS-REFERENCE TO RELATED APPLICATIONS

Not applicable.

BACKGROUND

*A continuation of the current reissue application has been filed as reissue application Ser. No. 11/635,849, on Dec. 8, 2006.*

1. Field of Invention

This invention relates to steel hair clips and other fasteners for holding a significant portion or all of a user's hair in a styled position.

2. Description of Prior Art

Typically, people who have medium to long hair, at times, prefer to wear their hair styled back away from their face and/or up away from their neck. By doing so, people enjoy a quick, easy, and cooler alternative to styling their hair down.

People with inevitably different thicknesses of hair, tend to wear their hair back or up for a significant duration of time if not all day. It is therefore desirable that the hair clip is able to accommodate a variety of hair thicknesses, secure the hair well and provide a comfortable and nonthreatening home for hair.

Clothing stores, beauty supply stores, and supermarkets commonly sell steel hair clips such as the one shown in FIG. 1. These steel hair clips are large enough to hold a whole head of hair as well as supply a mount for a decorative design. While the decorative designs on these hair clips have evolved, minimal improvement to the hair clip itself has been achieved.

Originally, these hair clips were made in such a way that when they were applied, a pivotal lower arm 12, an upper arm 14, and a hinge 16 were in direct contact with the user's hair. This design had three major drawbacks.

First, the antiquated hair clip exposed the hair to the hinge. This made it possible for strands of hair to get caught in or pinched by the hinge while the hair clip was in place. This catching or pinching of the hair likely resulted in hair being broken or damaged. If the hair clip slips or is removed from the user's hair while hair strands are caught in the hinge, those strands will likely be broken, pulled, or pulled out.

Secondly, the hair clip had a strong tendency to slip down out of place. The steel adjoining arms in direct contact with the hair did not cohere to the hair nor did it compact the hair sufficiently, allowing the clip to slip during use. This slipping either reduced the aesthetic effect of the style that was achieved during the clip's initial application or allowed the clip to slip off entirely, loosing all its effectiveness. Deteriorated style and diminished effectiveness reduced user satisfaction. Additionally, if strands of hair were caught in the hinge when the clip slipped, the user would experience pain and discomfort because of those strands being pulled or pulled out.

Thirdly, the hair clip did not fit well to a broad range of hair thicknesses. Due to the uncompressionable nature of the steel, there was little ability for the clip to adjust to varying thicknesses of hair. This being the case, the hair clip did not provide a snug fit to hair thinner than that for which the clip was originally designed. Because the clips were in essence too big for thin hair, accelerated slippage would occur. This accelerated slippage would shorten the time it took to damage, brake, pull, or pull out hair caught in the hinge. Here again, the slippage reduced the aesthetic effect and effectiveness, reducing user satisfaction of the clip.

Again, the prior art shown in FIG. 1 does not do anything to prevent hair from getting caught in the hinge. The steel arms do not cohere to the hair nor compress the hair. The clip does not fit a wide range of hair thicknesses, nor does it give the needed added stability to keep the hair clip in place for a sufficient period of use. This being the situation, the prior art does not secure the hair well nor does it provide comfort and a nonthreatening home for hair, diminishing aesthetics and user satisfaction.

SUMMARY

The "hair clip inner protector" is a device for protecting and holding in place hair in a hair clip. It is material that is added to the clip which; protects hair from becoming caught or damaged by the hinge, coheres to the hair, and gives the hair clip a snugger fit to a broader range of hair thicknesses.

Accordingly, several objects and advantages of my invention are that it fits a broader range of hair thicknesses, makes the hair clip more comfortable, it stays in place better and it provides a nonthreatening home for hair.

A hair clip equipped with the inner protector provides a comfortable, safe haven for hair. With the inner protector hair will not get caught in the hinge and therefore will not be damaged or broken. And upon slippage, if any occurs, or removal of the clip, hair is not pulled or pulled out. The inner protector also adds comfort by buffering out the cold, stiff steel that used to touch up against the user's neck or head. Instead the inner protector provides a soft, temperate feel.

A hair clip equipped with the inner protector fits a broader range of hair thicknesses. By adding a layer of compressionable material to the inside of the clip, the clip becomes better suited for medium to thin hair, and can still accommodate thick hair.

A hair clip equipped with the inner protector stays in place because the material of the protector coheres to hair and compacts the hair. The original steel did not cohere to the hair. However, materials such as vinyl, velvet, rubber, etc. that make up the protector provide greater friction and are therefore more coherent to hair than steel. And by adding a layer of compressionable material to the inside of the clip, space between the upper and lower arms that is unused is displaced and hair is more compact in the hair clip. This greater compact gives the hair clip a snugger fit to a broad range of hair thicknesses. This snugger fit in addition to the more coherent material is what provides a longer lasting fit.

Other objectives and advantages are that the hair clip inner protector can be made of different materials for different hair types and personal preferences. For example, people with thick hair could use the basic vinyl or thin velvet. Someone with thin hair might want to use one that is thicker or expands more, such as neoprene. Someone with extremely straight hair might want one made out of rubber, which is more gripping.

Further objects and advantages of my invention will become apparent from a consideration of the drawings and ensuing description.

DESCRIPTION OF DRAWINGS

FIG. 1 shows the prior art hair clip with out protector.

FIG. 2 shows a basic example of the shape of a hair clip inner protector before it is applied to the clip.

FIG. 3 shows a hair clip wrapped with the inner protector.

FIG. 4 shows an inner protector made of a different shape.

FIG. 5 shows an inner protector that does not have to be wrapped.

FIG. 6 shows a prefabricated inner protector.

FIG. 7 shows an inner protector with adhesive strips for application.

LIST OF REFERENCE NUMERALS

10 decorative base plate
12 lower arm
14 upper arm
16 hinge
18 clasp
19 eye hook
20 large rectangular portion (2)
22 small rectangular middle portion
30 adhesive strip

DESCRIPTION OF INVENTION

The hair clip inner protector is a piece of material such as vinyl, neoprene, velvet, rubber, suede, leather, etc. cut into a basic shape seen in FIG. 2. The piece of material in FIG. 2 is then wrapped onto the clip in FIG. 1. A large rectangular end portion 20 is wrapped around the lower arm 12 and the other large rectangular end portion 20 is wrapped around the upper arm 14. As a result, hinge 16 is covered by a small rectangular middle portion 22. The material is wrapped such that the two large rectangular portions 20 are neatly folded in two places (as one might do when folding a standard size sheet of paper to fit into a standard size envelope). The wings are folded and then glued or sown into place one on top of the other. The result is a finished product shown in FIG. 3.

To take advantage of the benefits the inner protector offers, make sure that your clip is equipped with one and apply the clip the same way you normally would.

Use both hands to gather the hair you wish to clip. Generally this is at least half the thickness of your hair. Then, slide the lower arm 12 under the hair you wish to clip. Pivot a decorative plate 10 along with the attached upper arm 14 across the gathered hair so that a clasp 18 joins together with an eye hook 19. Then press the eye hook 19 into the clasp 18 in order to fasten them together.

DESCRIPTION AND OPERATION OF EMBODIMENTS

The inner protector does not have to be the exact shape or size that I have used to define it. While I prefer the shape I have outlined in FIG. 2, there are certainly other shapes that could perform the same function equally well. Two examples of these additional embodiments are shown in FIGS. 4 and 5. In FIG. 4 the material is cut into a different shape, and would still necessitate being wrapped onto the clip. In FIG. 5 the material is cut into a shape that would not need to be wrapped, but merely glued into place. Also, the size of the protector may vary along with the clip's particular specifications.

The inner protector does not have to be applied to the hair clip in the way that I have described in order to be effective. FIGS. 6 and 7 show two other ways in which the inner protector could be applied to the hair clip while still maintaining effectiveness. FIG. 6 is a pre-sewn or pre-glued inner protector that can be sold separately and then slid onto the adjoining arms into place. Simply remove the inserted upper arm from the decorative plate, slide the prefabricated protector onto the arms and reinsert the upper arm back into place. FIG. 7 shows another inner protector that could also be sold separately. This one is made with an adhesive strip 30 so that you could warp the protector around the hair clip, remove the adherent tape and seal the wings, one on top of the other.

While I have discussed making the inner protector out of vinyl, velvet, rubber neoprene, suede, leather, cotton, felt, etc., the list of materials for which you could make one are endless. As I have previously mentioned, different materials would be better suited for different hair types.

The inner protector can, and should be, made out of different colors of materials. The different colors could be representative of different colors of hair or they could be colors which are incorporated into the decorative plate.

On the one hand, the inner protector could be made out of different shades that represent various colors of hair. This way the inner protector could be camouflaged into the user's hair. Such colors would therefore repress different shades of brunette, red, black, blonde, and gray.

Or, on the other hand the color of the inner protector could match the decorative hair plate. So, for example if the decorative plate is a floral print made of whites, pinks, purples and greens, the protector could be of the same print or of a matching pink. If the decorative plate is the color gold, the inner protector could also be the color gold.

Combining the option of using different materials with the option of using different colors may result in the inner protector and decorative plate matching in both material and color. For example, both the decorative plate and the inner protector could be made of black velvet, white suede, or vinyl that is the color of a blond highlight.

CONCLUSIONS AND SCOPE OF INVENTION

Thus the reader will see that the hair clip inner protector adds comfort by preventing hair from getting caught in the hinge and being damaged, broken, pulled or pulled out while increasing the effectiveness of the hair clip by making it stay in place better.

While my above description contains many specificities, these should not be construed as limitations on the scope of the invention, but rather as an exemplification of one preferred embodiment thereof. Many other variations are possible. For example, rather than adding the inner protector to the clip, the lower and upper arms themselves, could be the inner protector. The arms could be covered in felt or made of an alternative material that still functions like the steel arms, and is able to compress the hair, adheres to the hair, and protect the hair from the hinge.

Accordingly, the scope of the invention should be determined not by the embodiments illustrated, but by the appended claims and their legal equivalents.

I claim:

[1. A hair clip for protecting and holding in place comprising:

a decorative base plate having a clasp, an inner upper arm, said base plate being pivotally connected to a lower inner arm at one end of said base plate by a hinge, said clasp being positioned between said base plate and said upper arm at another end, said lower arm further having an eye hook at one end to fasten with said clasp; and a unitary inner protector comprising a material having two large rectangular portions at each end and a smaller rectangular portion at an intermediate portion, said large rectangular portions being secured around said upper and lower arms with adhesive and said smaller rectangular portion being secured to and covered said hinge.]

*2. A hair clip comprising:*

*a base plate, a first arm coupled to the base plate;*

*a second arm coupled to the base plate, wherein the second arm is movable between an open position and a closed position about a hinge;*

*a protector substantially covering the hinge over an area where the second arm is coupled to the base plate, wherein said protector is a tubular sleeve secured around the first arm and the second arm, wherein said protector includes an aperture through which a portion of the hinge extends; a clasp coupled to the base plate and a hook extending from the second arm, wherein the hook engages the clasp to secure the second arm in the closed position.*

*3. A hair clip comprising:*

*a base plate having a clasp, an inner upper arm, said base plate being pivotally connected to a lower inner arm at one end of said base plate by a hinge, said clasp being positioned between said base plate and said upper arm at another end, said lower arm further having a hook at one end to fasten with said clasp; and*

*a unitary inner protector comprising a material having two large rectangular portions at each end and a smaller rectangular portion at an intermediate portion, said large rectangular portions being secured around said upper and lower arms with adhesive and said smaller rectangular portion being secured to and covered said hinge.*

*4. A hair clip for protecting and holding in place comprising:*

*a decorative base plate having a clasp, an inner upper arm, said base plate being pivotally connected to a lower inner arm at one end of said base plate by a hinge, said clasp being positioned between said base plate and said upper arm at another end, said lower arm further having an eye hook at one end to fasten with said clasp; and*

*a unitary inner protector comprising a material having two large rectangular portions at each end and a smaller rectangular portion at an intermediate portion, said large rectangular portions being secured around said upper and lower arms with adhesive and said smaller rectangular portion being secured to and covered said hinge.*

* * * * *